Jan. 17, 1933.  M. J. JANSEN ET AL  1,894,562
INSTALLATION FOR THE REGULATION OF THE ANGULAR VELOCITY OF A SHAFT
Filed Jan. 31, 1930  2 Sheets-Sheet 1

Inventors:-
Marinus Jacobus Jansen
Roelof Vermeulen - and
Nicolaas Anthony Johannes Voorhoeve Jan. 17, 1933.  M. J. JANSEN ET AL  1,894,562
INSTALLATION FOR THE REGULATION OF THE ANGULAR VELOCITY OF A SHAFT
Filed Jan. 31, 1930  2 Sheets-Sheet 2

Marinus Jacobus Jansen
Roelof Vermeulen
Nicolaas Anthony Johannes Voorhoeve
INVENTORS.

BY
ATTORNEYS.

Patented Jan. 17, 1933

1,894,562

UNITED STATES PATENT OFFICE

MARINUS JACOBUS JANSEN, ROELOF VERMEULEN, AND NICOLAAS ANTHONY JOHANNES VOORHOEVE, OF EINDHOVEN, NETHERLANDS, ASSIGNORS TO N. V. PHILIPS' GLOEILAMPENFABRIEKEN, OF EINDHOVEN, NETHERLANDS, A LIMITED LIABILITY COMPANY OF THE NETHERLANDS

INSTALLATION FOR THE REGULATION OF THE ANGULAR VELOCITY OF A SHAFT

Application filed January 31, 1930, Serial No. 425,052, and in the Netherlands March 9, 1929.

The invention relates to an installation for exactly regulating the number of revolutions of a shaft. In some cases, for example in driving the shaft of the turntable of a gramophone, it is very important to keep the angular velocity of this shaft constant within narrow limits as otherwise the reproduction does not remain perfect. The invention suggests a relatively simple means which permits the obtention of an exact regulation in a reliable manner.

According to the invention, with the shaft are coupled two electric generators of which one acts in the input circuit of an amplifier whose output circuit comprises the field winding of the second generator which acts as a brake-dynamo.

The said amplifier must work as much as possible without inertia and according to the invention use should preferably be made of a thermionic resistance amplifier having galvanic connections between the coupled circuits.

Figure 1:
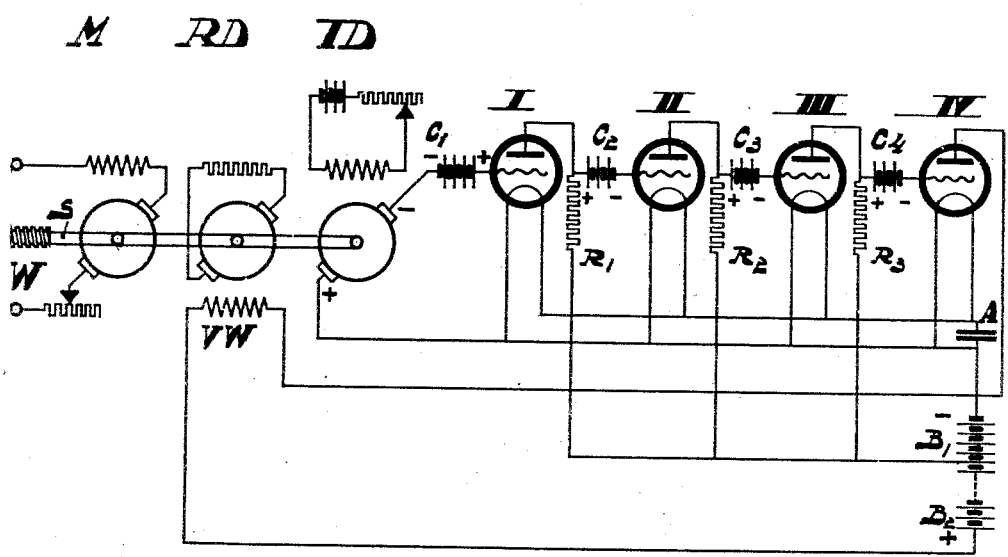
Figure 2:
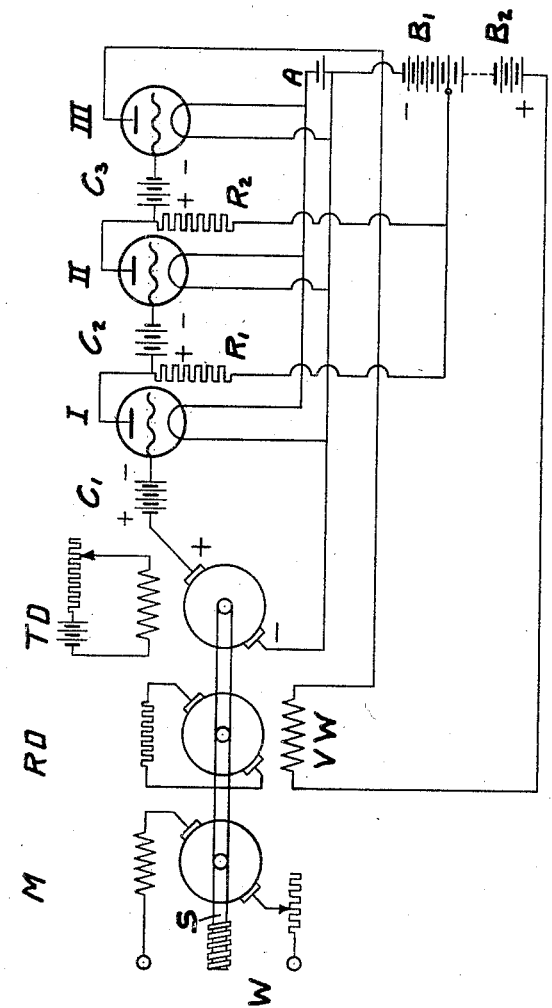

A short explanation follows hereinafter with reference to the accompanying drawings which represent, by way of example, in Figs. 1 and 2, respectively two embodiments of the invention.

To a shaft S are secured the armatures of a motor M, a brake-dynamo RD and a speed adjusting dynamo TD. The latter is provided with a separately excited field winding but may also be constituted by a magnet or by a shunt dynamo although the use of the latter has proved to be less recommendable.

The minus terminal of the speed adjusting dynamo is connected through a galvanic battery $C_1$ to the control grid of a thermionic valve I whereas the plus terminal is connected to the cathode of this valve.

The anode circuit of the valve I comprises a resistance $R_1$ the ends of which are connected to the grid (through a battery $C_2$) and to the cathode (through a battery $B_1$) of a second valve II.

With the valve II is similarly coupled a further valve III which finally is coupled again with the valve IV. The four valves thus constitute a four-stage resistance amplifier. However, any given number of stages may be used (with some restrictions further to be mentioned in connection, for example, with Fig. 2), said number being determined for each particular case by circumstances.

In the anode circuit of the last valve of the cascade is included the field winding VW of the brake-dynamo RD.

The working is as follows:

So long as the voltage of the mains from which the motor M is fed and the load of the shaft S remain constant, the number of revolutions of the latter retains the value at which there is equilibrium between the various couples acting on the shaft.

If, however, this equilibrium is disturbed in some way or other, the number of revolutions increases or decreases. Let us assume that the number of revolutions increases. In this case the terminal voltage of the speed adjusting dynamo increases proportionally owing to which the potential of the grid of valve I and consequently the anode current in the resistance $R_1$ decrease. The potential difference between the ends of the resistance $R_1$ consequently decreases and since these ends are connected to the grid and to the cathode of the valve II in such manner that the potential of the grid end is lower than that of the cathode end, the anode current in the resistance $R_2$ increases. Consequently the potential of the grid of valve III decreases so that the anode current in $R_3$ decreases which causes the grid potential of the valve IV to rise.

Finally, the anode current of the final valve IV, consequently, increases and since the field winding VW is traversed by this current, the antagonistic couple of the brake-dynamo BD increases, the increase of the number of revolutions being thus counteracted.

The same remarks apply if the number of revolutions decreases.

With the arrangement of the valves I to IV as represented and described, it is evident that the grid potentials of these valves alternately increase and decrease. It follows that when the speed adjusting dynamo is connected to the valve I in such manner that at an increasing number of revolutions the grid potential of this valve decreases (as illustrated and described) the number of valves which have to be connected in cascade must be even. If, on the contrary, the leads leading to the brushes of the speed indicator dynamo are crossed, an odd number of valves should be used, and this form of the invention is shown in Fig. 2, in connection with three stages of amplification, where the negative terminal of the direct current generator is connected to the cathode of the first amplifier tube, and the positive terminal is connected through a battery to the grid of said tube, the arrangement being otherwise the same as that in Fig. 1.

However, when separate anode and filament current batteries are used, the coupling between the valves may also be such that the potentials of all the grids either increase or decrease. It is evident that in this case, one is consequently free in the choice of the number of valves.

The above-described method of regulation has the advantage that in spite of considerable variations of the tension and/or the frequency of the mains and of the fluctuations of the load of the shaft itself, the number of revolutions of the latter is kept within very narrow limits. This shaft can therefore be used for driving devices which are extremely sensitive to variations of the number of revolutions, such, for example as gramophones, wire windings and spinning machines and others. For example, for a gramophone this drive may be effected by means of a worm W which is secured to the shaft.

However, since such transmissions may themselves give rise to irregularities in the number of revolutions of the shaft of the device which is driven, it may sometimes be advantageous to mount the speed adjusting dynamo (and if required also the brake-dynamo) directly on the said shaft and consequently behind instead of before the transmission.

When applying the invention to the so-called "talking films", that is, devices in which a cinematographic projector is driven synchronously with a gramophone, the brake-dynamo may be utilized to furnish current to the various relays which are commonly utilized with such a device, a constant and effective load of the brake-dynamo being thus obtained.

What we claim is:

1. An installation for regulating the angular velocity of a shaft, comprising a direct current generator, a second generator which acts as a brake dynamo, both generators being mechanically coupled to the said shaft, and an amplifier having an input and an output circuit, the first generator being connected to the input circuit of the said amplifier, and the field winding of the second generator being connected to the output circuit of the said amplifier.

2. An installation for maintaining constant the angular velocity of a shaft, comprising a direct current generator mechanically coupled to said shaft, a resistance coupled amplifier having a plurality of tubes, one of the terminals of which generator is connected with the cathode of the first tube of the resistance coupled amplifier, the other being connected through a battery to the grid of the said tube, and a brake-dynamo mechanically coupled to the said shaft, the exciting winding of which brake-dynamo is inserted in the output circuit of the said amplifier.

3. An installation for maintaining constant the angular velocity of a shaft, comprising a direct current generator mechanically coupled to said shaft, a resistance coupled amplifier having a number of tubes, the anode of each tube of which is connected through a battery to the grid of the following tube one of the terminals of which generator is connected to the cathode of the first tube of the resistance coupled amplifier, the other being connected through a battery to the grid of the said tube, and a brake-dynamo mechanically connected to the said shaft, the exciting winding of which dynamo is inserted in the output circuit of the said amplifier.

4. An installation for regulating the angular velocity of a shaft, comprising a direct current generator mechanically coupled to said shaft, a resistance coupled amplifier, having an even number of tubes, the anode of each tube of which is connected through a battery to the grid of the following tube, the positive terminal of the said generator being connected to the cathode of the first tube of the amplifier, the negative terminal being connected through a battery to the grid of the said tube, and a brake-dynamo mechanically coupled to the said shaft, the exciting winding of said brake-dynamo being inserted in the output circuit of the said amplifier.

5. An installation for regulating the angular velocity of a shaft, comprising a direct current generator mechanically coupled to said shaft, a resistance coupled amplifier, having an odd number of tubes, the anode of each tube of which is connected through a battery to the grid of the following tube, the negative terminal of the said generator being connected to the cathode of the first tube of the amplifier, the positive terminal being connected through a battery to the grid of the said tube, and a brake-dynamo, mechanically coupled to the said shaft, the exciting winding of said brake-dynamo being inserted in the output circuit of the said amplifier.

In testimony whereof we have signed our names to this specification.

MARINUS JACOBUS JANSEN.
ROELOF VERMEULEN.
NICOLAAS ANTHONY JOHANNES VOORHOEVE.